US012716003B2

(12) United States Patent
Hirakawa et al.

(10) Patent No.: US 12,716,003 B2
(45) Date of Patent: Aug. 25, 2026

(54) AQUEOUS INKJET INK COMPOSITION AND PRINTED MATTER

(71) Applicant: SAKATA INX CORPORATION, Osaka (JP)

(72) Inventors: Satoshi Hirakawa, Osaka (JP); Masahiro Ueki, Osaka (JP); Yuya Watanabe, Osaka (JP); Hiroyuki Konishi, Osaka (JP); Hirohito Maeda, Osaka (JP)

(73) Assignee: SAKATA INX CORPORATION, Osaka (JP)

(*) Notice: Subject to any disclaimer, the term of this patent is extended or adjusted under 35 U.S.C. 154(b) by 136 days.

(21) Appl. No.: 18/857,279

(22) PCT Filed: Mar. 1, 2023

(86) PCT No.: PCT/JP2023/007541
§ 371 (c)(1),
(2) Date: Oct. 16, 2024

(87) PCT Pub. No.: WO2023/218734
PCT Pub. Date: Nov. 16, 2023

(65) Prior Publication Data

US 2025/0270411 A1 Aug. 28, 2025

(30) Foreign Application Priority Data

May 10, 2022 (JP) ................................ 2022-077516

(51) Int. Cl.
*C09D 11/32* (2014.01)
*C09D 11/322* (2014.01)
*C09D 11/38* (2014.01)

(52) U.S. Cl.
CPC ............ *C09D 11/322* (2013.01); *C09D 11/38* (2013.01)

(58) Field of Classification Search
CPC ...... C09D 11/322; C09D 11/38; C09D 11/107
See application file for complete search history.

(56) References Cited

U.S. PATENT DOCUMENTS

2004/0024086 A1 2/2004 Segawa et al.
2013/0323474 A1 12/2013 Gotou et al.
2017/0369725 A1 12/2017 Mitsuyoshi et al.
2018/0030292 A1 2/2018 Gotou et al.
2018/0187034 A1 7/2018 Takeno et al.
2019/0283406 A1 9/2019 Fujita et al.
2020/0157366 A1 5/2020 Gotou et al.

FOREIGN PATENT DOCUMENTS

EP 2730424 A1 5/2014
EP 4491409 A1 1/2025
EP 4491682 A1 1/2025
JP 2003-306620 A 10/2003
JP 2013-248763 A 12/2013
JP 2016-125057 A 7/2016
JP 2016222754 A * 12/2016
JP 2017-008319 A 1/2017
JP 2018-083930 A 5/2018
JP 2018-115325 A 7/2018
JP 2019-006978 A 1/2019
JP 6532296 B2 * 6/2019
JP 2019-155837 A 9/2019
WO WO-2020213219 A1 * 10/2020 .......... C09D 11/324

OTHER PUBLICATIONS

Extended Search Report issued in corresponding European Patent Application No. 23803221.3, dated Jul. 25, 2025, in 7 pages.
International Preliminary Report on Patentability and PCT Written Opinion (English Translation) in PCT/JP2023/007541, mailed Nov. 21, 2024 in 6 pages.
International Search Report in PCT/JP2023/007541 mailed May 9, 2023 in 2 pages.
Office Action in Japanese Patent Application No. 2022-077516 issued on Jul. 12, 2022 & English translation in 8 pages.

* cited by examiner

*Primary Examiner* — Sharon Polk
(74) *Attorney, Agent, or Firm* — Knobbe Martens Olson & Bear LLP

(57) ABSTRACT

An aqueous inkjet ink composition containing a pigment, an anionic group-containing resin, a resin emulsion, a surfactant, a water-soluble solvent, and water, in which a water-soluble solvent having a boiling point of at most 200° C. under 1 atm accounts for at least 90 mass % of the water-soluble solvent; the surfactant contains a polyoxyethylene alkyl ether and a silicone-based surfactant satisfying a specific condition; and the polyoxyethylene alkyl ether has an HLB value of 7-12. The aqueous inkjet ink composition has excellent discharge stability, favorable filling in a solid part and no unevenness even when printed and recorded on a non-absorptive print medium, and excellent drying properties on a paper surface.

12 Claims, No Drawings

AQUEOUS INKJET INK COMPOSITION AND PRINTED MATTER

This application is the U.S. National Phase under 35 U.S.C. § 371 of International Application PCT/JP2023/007541, filed Mar. 1, 2023, designating the U.S., and published in Japanese as WO 2023/218734 on Nov. 16, 2023, which claims priority to Japanese Patent Application No. 2022-077516, filed May 10, 2022, the entire content of which is incorporated herein by reference.

TECHNICAL FIELD

The present invention relates to an aqueous inkjet ink composition and a printed matter.

BACKGROUND ART

An inkjet printing and recording method is a printing and recording method in which droplets of an aqueous inkjet ink composition are directly ejected from extremely fine nozzles and attached onto printing and recording media to obtain letters and images. Such an aqueous inkjet ink composition usually contains a pigment, an alkali-soluble resin, a surfactant, a water-soluble solvent, water and the like, and for example, Patent Document 1 discloses an aqueous inkjet ink composition containing a pigment, an anionic group-containing resin (alkali-soluble resin), a resin emulsion, a specific surfactant, a water-soluble solvent, and water.

PRIOR ART DOCUMENT

Patent Document

Patent Document 1: JP-A-2016-222754

SUMMARY OF THE INVENTION

Problems to be Solved by the Invention

Like the aqueous inkjet ink composition disclosed in Patent Document 1, there is a demand for aqueous inkjet ink compositions that are excellent in ejection stability and are favorably filled in solid portions and do not cause unevenness in solid portions in a case of being inkjet printed and recorded on non-absorbent printing media such as coated paper and polyvinyl chloride sheets as well. From the viewpoint of shortening the drying time of printed matter and improving productivity, there is a demand for aqueous inkjet ink compositions that exhibit favorable drying properties on the paper surface.

The present invention has been made in view of the circumstances, and an object thereof is to provide an aqueous inkjet ink composition that is excellent in ejection stability, is favorably filled in a solid portion and does not cause unevenness in a case of being printed and recorded on a non-absorbent printing medium as well, and further is excellent in drying properties on a paper surface.

Means for Solving the Problems

[Item 1] In other words, the present invention relates to an aqueous inkjet ink composition containing a pigment, an anionic group-containing resin, a resin emulsion, a surfactant, a water-soluble solvent, and water, in which the water-soluble solvent contains a water-soluble solvent having a boiling point of 200° C. or less at 1 atmospheric pressure at 90% by mass or more, and the surfactant contains a polyoxyethylene alkyl ether and a silicone-based surfactant, in which the polyoxyethylene alkyl ether has an HLB value of 7 or more and 12 or less, and the silicone-based surfactant satisfies a requirement that a maximum value of a transmittance (specific transmittance 1) of a mixture composed of 99.9 parts by mass of water and 0.1 parts by mass of the silicone-based surfactant at 25° C. and a wavelength of 380 nm to 780 nm is 30% or less, and a requirement that a maximum value of a transmittance (specific transmittance 2) of a mixture composed of 89.9 parts by mass of water, 10 parts by mass of diethylene glycol monobutyl ether, and 0.1 parts by mass of the silicone-based surfactant at 25° C. and a wavelength of 380 nm to 780 nm is 95% or more.

[Item 2] The present invention relates to the aqueous inkjet ink composition according to item 1, containing one or more surfactants selected from the group consisting of an acetylene diol-based surfactant and an alkane diol-based surfactant.

[Item 3] The present invention relates to the aqueous inkjet ink composition according to item 1 or 2, in which the water-soluble solvent having a boiling point of 200° C. or less at 1 atmospheric pressure is propylene glycol.

[Item 4] The present invention relates to the aqueous inkjet ink composition according to any one of items 1 to 3, in which the resin emulsion is one or more selected from the group consisting of an acrylic resin emulsion and a styrene-acrylic resin emulsion.

[Item 5] The present invention relates to the aqueous inkjet ink composition according to any one of items 1 to 4, in which a glass transition temperature of a resin in the resin emulsion is −35° C. or more and 35° C. or less.

[Item 6] The present invention relates to the aqueous inkjet ink composition according to any one of items 1 to 5, in which the polyoxyethylene alkyl ether is a branched chain having an alkyl group having 10 or more and 15 or less carbon atoms, and has an average number of moles of ethyleneoxy groups added of 3 or more and 10 or less.

[Item 7] The present invention relates to a printed matter obtained by performing printing using the aqueous inkjet ink composition according to any one of items 1 to 6.

Effect of the Invention

The mechanism by which the effects of the present invention are exerted is not clear, but is presumed to be as follows. In the aqueous inkjet ink composition of the present invention, unlike the formulation in Patent Document 1, a specific polyoxyethylene alkyl ether is used as a surfactant to decrease the surface tension of ink droplets that have landed on a printing medium and improve the wetting and spreading of dots. Furthermore, the effect of decreasing the surface tension is maintained in a state where the moisture in the ink evaporates as the ink dries and the proportion of the water-soluble solvent in the ink becomes relatively large as well, and thus uneven drying is suppressed and the ink can be dried uniformly, Hence, in a case where the aqueous inkjet ink composition is inkjet printed and recorded on a non-absorbent printing medium such as coated paper or a polyvinyl chloride sheet as well, ejection stability of the ink compositions is excellent and filling in the solid portions of printed and recorded images is favorable and there is no unevenness in the solid portions. The aqueous inkjet ink composition of the present invention contains a water-soluble solvent having a boiling point of 200° C. or less at 1 atmospheric pressure in a specific amount or more and is thus excellent in drying properties on the paper surface.

Consequently, the aqueous inkjet ink composition of the present invention exhibits coating stability on these non-absorbent printing media and can form favorable printed and recorded images.

MODE FOR CARRYING OUT THE INVENTION

The aqueous inkjet ink composition of the present invention contains at least a pigment, an anionic group-containing resin, a resin emulsion, a surfactant, a water-soluble solvent, and water.

<Pigment>

As the pigment, an organic pigment and an inorganic pigment that are used in inkjet ink compositions can be used without particular limitation. Examples of the organic pigment include dye lake pigments, azo-based pigments, benzimidazolone-based pigments, phthalocyanine-based pigments, quinacridone-based pigments, anthraquinone-based pigments, dioxazine-based pigments, indigo-based pigments, thioindico-based pigments, perylene-based pigments, perinone-based pigments, diketopyrrolopyrrole-based pigments, isoindolinone-based pigments, nitro-based pigments, nitroso-based pigments, flavanthrone-based pigments, quinophthalone-based pigments, pyranthrone-based pigments, and indanthrone-based pigments. Examples of the inorganic pigment include carbon black, titanium oxide, zinc oxide, red iron oxide, graphite, black iron oxide, chrome oxide green, and aluminum hydroxide. The pigment may be subjected to a surface treatment using a known surface treatment agent. As the pigment, it is only required to use at least one kind, and two or more kinds can be used in combination.

Specific examples of the pigments for each typical hue include the following.

Examples of yellow pigments include C. I. Pigment Yellows 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, and 213.

Examples of magenta pigments include C.I. Pigment Reds 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, and 270, and C.I. Pigment Violet 19.

Examples of cyan pigments include C. I. Pigment Blues 1, 2, 3, 15, 15:1, 15:2, 15:3, 15:4, 15:6, 16, 18, 22, 27, 29, and 60.

Examples of black pigments include carbon black (C. I. Pigment Black 7).

Examples of white pigments include titanium oxide and aluminum oxide, and the white pigments may be subjected to a surface treatment using various materials such as alumina and silica.

The proportion of the pigment in the aqueous inkjet ink composition is preferably 1% by mass or more, more preferably 2% by mass or more from the viewpoint of improving the printing density of printed matter, and is preferably 10% by mass or less, more preferably 8% by mass or less from the viewpoint of improving the ejection stability. However, in a case where the pigment is a white pigment, the proportion of the white pigment in the aqueous inkjet ink composition is preferably 48 by mass or more, more preferably 8% by mass or more and preferably 30% by mass or less, more preferably 20% by mass or less. In other words, the proportion of the pigment in the aqueous inkjet ink composition is preferably 1% by mass or more and 10% by mass or less, more preferably 2% by mass or more and 8% by mass or less from the viewpoint of improving the printing density of printed matter and the viewpoint of improving the ejection stability. In a case where the pigment is a white pigment, the proportion of the white pigment in the aqueous inkjet ink composition is preferably 4% by mass or more and 30% by mass or less, more preferably 8% by mass or more and 20% by mass or less.

<Anionic Group-Containing Resin>

The anionic group-containing resin is an ordinary alkali-soluble resin that can be used for pigment dispersion of inks and paints or as a binder, and is not particularly limited as long as it can be dissolved in an aqueous medium in the presence of a basic compound, but is preferably a resin containing one kind or two or more kinds of anionic groups such as a carboxyl group, a sulfonic acid group, and a phosphonic acid group.

The anionic group-containing resin preferably further has in the molecule a hydrophobic moiety mainly for improving the adsorptivity to the pigment and/or a hydrophilic moiety mainly for obtaining an action effective in preventing aggregation in an aqueous medium. Examples of the hydrophobic moiety to be introduced into the molecule include hydrophobic groups such as a long-chain alkyl group and an alicyclic or aromatic cyclic hydrocarbon group, and examples of the hydrophilic moiety to be introduced into the molecule include hydrophilic groups such as a (poly)oxy-alkylene chain, a basic nitrogen-containing group, a hydroxyl group, and an epoxy group.

The acid value of the anionic group-containing resin is preferably 50 mgKOH/g or more. The acid value of the anionic group-containing resin is preferably 60 mgKOH/g or more, more preferably 70 mgKOH/g or more from the viewpoint of enhancing the dispersion stability of the pigment. The acid value of the anionic group-containing resin is preferably 350 mgKOH/g or less, more preferably 300 mgKOH/g or less from the viewpoint of enhancing the water resistance of printed matter. In other words, the acid value of the anionic group-containing resin is preferably 60 mgKOH/g or more and 350 mgKOH/g or less, more preferably 70 mgKOH/g or more and 300 mgKOH/g or less from the viewpoint of enhancing the dispersion stability of the pigment and the viewpoint of enhancing the water resistance of printed matter. The acid value is a theoretical acid value of the mg number of potassium hydroxide theoretically required to neutralize 1 g of the anionic group-containing resin, which is arithmetically determined based on the composition of the monomer used for synthesizing the anionic group-containing resin.

The weight average molecular weight of the anionic group-containing resin is preferably 3,000 or more, more preferably 7,000 or more from the viewpoint of enhancing the dispersion stability of the pigment. The weight average molecular weight of the anionic group-containing resin is preferably 200,000 or less, more preferably 100,000 or less from the viewpoint of enhancing the solubility in an aqueous medium to be described later.

The weight average molecular weight can be measured by the gel permeation chromatography (GPC). As an example, the weight average molecular weight in terms of polystyrene can be determined by performing chromatography using Water 2690 (manufactured by Waters Corporation) as a GPC instrument, and PLgel, 5μ, and MIXED-D (manufactured by Polymer Laboratories Inc.) as a column under the conditions of a tetrahydrofuran as a developing solvent, a column temperature of 25° C., a flow rate of 1 ml/min, an RI detector, a sample injection concentration of 10 mg/ml, and an injection volume of 100 μl.

Examples of the anionic group-containing resin include acrylic copolymer resins, maleic acid-based copolymer resins, polyester resins obtained by condensation polymerization reaction, and polyurethane resins. Materials for synthesizing such anionic group-containing resins are disclosed, for example, in JP-A-2000-94825, and it is possible to use an acrylic copolymer resin, a maleic acid-based copolymer resin, a polyester-based resin, a polyurethane-based resin and the like that are obtained using the materials described in the publication. Furthermore, it is also possible of course to use resins obtained using materials other than these materials. As the anionic group-containing resin, it is only required to use at least one kind, and two or more kinds can be used in combination.

As the acrylic copolymer resin, for example, one obtained by polymerizing a mixture of other monomers copolymerizable with an anionic group-containing monomer in a solvent in the presence of an ordinary radical generator (for example, benzoyl peroxide, tert-butyl peroxybenzoate, or azobisisobutyronitrile) can be used.

Examples of the anionic group-containing monomer include monomers having at least one kind of anionic group selected from the group consisting of a carboxyl group, a sulfonic acid group, and a phosphonic acid group, and among these, a monomer having a carboxyl group is particularly preferable.

Examples of the monomer having a carboxyl group include acrylic acid, methacrylic acid, crotonic acid, itaconic acid, maleic acid, fumaric acid, 2-carboxyethyl (meth)acrylate, 2-carboxypropyl (meth)acrylate, maleic anhydride, fumaric anhydride, and maleic acid half ester. Examples of the monomer having a sulfonic acid group include sulfoethyl methacrylate. Examples of the monomer having a phosphonic acid group include phosphonoethyl methacrylate.

As the other monomers copolymerizable with an anionic group-containing monomer, it is preferable to contain a hydrophobic group-containing monomer from the viewpoint of improving the adsorption on a pigment.

Examples of the hydrophobic group-containing monomer include, as a monomer having a long-chain alkyl group, alkyl esters having 8 or more carbon atoms of a radically polymerizable unsaturated carboxylic acid such as (meth) acrylic acid (for example, 2-ethylhexyl (meth)acrylate, octyl (meth)acrylate, lauryl (meth)acrylate, stearyl (meth)acrylate, 2-hydroxystearyl (meth)acrylate and the like), alkyl vinyl ethers having 8 or more carbon atoms (for example, dodecyl vinyl ether and the like), and vinyl esters of fatty acids having 8 or more carbon atoms (for example, vinyl 2-ethylhexanoate, vinyl laurate, vinyl stearate and the like); as a monomer having an alicyclic hydrocarbon group, cyclohexyl (meth)acrylate and the like; and as a monomer having an aromatic hydrocarbon group, styrene-based monomers such as benzyl (meth)acrylate, styrene, α-styrene, and vinyltoluene.

As the other monomers copolymerizable with the anionic group-containing monomer, a hydrophilic group-containing monomer is preferably contained from the viewpoint of suppressing aggregation of the anionic group-containing resin in an aqueous medium to be described later.

Examples of the hydrophilic group-containing monomer include, as a monomer having a (poly)oxyalkylene chain, esterified products of a (poly)alkylene glycol in which one terminal is capped with alkyl such as methoxy polyethylene glycol, methoxy polyethylene polypropylene glycol, ethoxy polyethylene glycol, ethoxy polyethylene polypropylene glycol, propoxy polyethylene glycol, and propoxy polyethylene polypropylene glycol, and a radically polymerizable unsaturated carboxylic acid such as (meth)acrylic acid, and ethylene oxide adducts and/or propylene oxide adducts of a radically polymerizable unsaturated carboxylic acid such as (meth)acrylic acid; as a basic group-containing monomer, vinylpyrrolidones such as 1-vinyl-2-pyrrolidone and 1-vinyl-3-pyrrolidone, vinylpyridines such as 2-vinylpyridine, 4-vinylpyridine, 5-methyl-2-vinylpyridine, and 5-ethyl-2-vinylpyridine, vinyl imidazoles such as 1-vinyl imidazole and 1-vinyl-2-methylimidazole, vinylpiperidines such as 3-vinylpiperidine and N-methyl-3-vinylpiperidine, nitrogen-containing derivatives of (meth)acrylic acid such as dimethylaminoethyl (meth)acrylate, diethylaminoethyl (meth)acrylate, tert-butylaminoethyl (meth)acrylate, (meth) acrylamide, N-methylol (meth)acrylamide, N-butoxymethyl (meth)acrylamide, N-methoxy(meth)acrylamide, N-ethoxy (meth)acrylamide, N-dimethylacrylamide, and N-propylacrylamide; as a monomer having a hydroxyl group, hydroxyalkyl esters of (meth)acrylic acid such as hydroxyethyl (meth)acrylate and hydroxypropyl (meth)acrylate; and as a monomer having an epoxy group, glycidyl (meth) acrylate.

Examples of copolymerizable monomers other than the hydrophobic group-containing monomer and hydrophilic group-containing monomer include alkyl esters having less than 8 carbon atoms of (meth)acrylic acid, such as methyl (meth)acrylate, ethyl (meth)acrylate, propyl (meth)acrylate, isopropyl (meth)acrylate, butyl (meth)acrylate, and hexyl (meth)acrylate.

The amount of the anionic group-containing resin used is preferably 10 parts by mass or more, more preferably 20 parts by mass or more, still more preferably 30 parts by mass or more with respect to 100 parts by mass of the pigment from the viewpoint of enhancing the dispersion stability of the pigment. The amount of the anionic group-containing resin used is preferably 100 parts by mass or less, more preferably 80 parts by mass or less, still more preferably 60 parts by mass or less with respect to 100 parts by mass of the pigment from the viewpoint of decreasing the viscosity of the ink composition. In other words, the amount of the anionic group-containing resin used is preferably 10 parts by mass or more and 100 parts by mass or less, more preferably 20 parts by mass or more and 80 parts by mass or less, still more preferably 30 parts by mass or more and 60 parts by mass or less with respect to 100 parts by mass of the pigment from the viewpoint of enhancing the dispersion stability of the pigment and the viewpoint of decreasing the viscosity of the ink composition.

<Basic Compound>

The aqueous inkjet ink composition preferably contains a basic compound from the viewpoint of dissolving the anionic group-containing resin. Examples of the basic compound include inorganic basic compounds such as sodium hydroxide and potassium hydroxide; and organic basic compounds such as ammonia, methylamine, ethylamine, monoethanolamine, N, N-dimethylethanolamine, N, N-diethylethanolamine, N, N-dibutylethanolamine, diethanolamine, N-methyldiethanolamine, triethanolamine, morpholine, N-methylmorpholine, and N-ethylmorpholine. The basic compounds can be used singly or in combination of two or more kinds thereof.

The proportion of the basic compound in the aqueous inkjet ink composition is only required to be an amount in which the anionic group-containing resin is dissolved in a medium, but usually is preferably 0.05% by mass or more, more preferably 0.1% by mass or more from the viewpoint of enhancing the dispersion stability of the anionic group-containing resin, and is preferably 18 by mass or less, more preferably 0.5% by mass or less from the viewpoint of enhancing the water resistance of printed matter. In other words, the proportion of the basic compound in the aqueous inkjet ink composition is preferably 0.05% by mass or more and 1% by mass or less, more preferably 0.1% by mass or more and 0.5% by mass or less from the viewpoint of enhancing the dispersion stability of the anionic group-containing resin and the viewpoint of enhancing the water resistance of printed matter.

<Resin Emulsion>

The resin emulsion is a water-based emulsion. Examples of the water-based emulsion include an acrylic resin emulsion, a styrene-acrylic resin emulsion, a polyester-based resin emulsion, a polyurethane-based resin emulsion, a polyvinyl acetate-based resin emulsion, a polyvinyl chloride-based resin emulsion, a polybutadiene-based resin emulsion, and a polyethylene-based resin emulsion. Among these, an acrylic resin emulsion and a styrene-acrylic resin emulsion are preferable since the obtained printed matter is excellent in appearance and various resistances such as water resistance, solvent resistance, abrasion resistance, and heat resistance. As the resin emulsion, it is only required to use at least one kind, and two or more kinds can be used in combination.

From the viewpoint of enhancing the ejection stability of the ink composition, the glass transition temperature of the resin in the resin emulsion is preferably −35° C. or more, more preferably −30° C. or more, still more preferably −20° C. or more. From the viewpoint of enhancing the film-forming properties of the ink on the printing medium, the glass transition temperature of the resin in the resin emulsion is preferably 35° C. or less, more preferably 30° C. or less, still more preferably 20° C. or less. In other words, from the viewpoint of enhancing the ejection stability of the ink composition and the viewpoint of enhancing the film-forming properties of the ink on the printing medium, the glass transition temperature of the resin in the resin emulsion is preferably −35° C. or more and 35° C. or less, more preferably −30° C. or more and 30° C. or less, still more preferably −20° C. or more and 20° C. or less.

In a case where the resin in the emulsion is an acrylic resin or a styrene-acrylic resin emulsion, the glass transition temperature of the resin in the resin emulsion is the theoretical glass transition temperature determined by the following Wood equation.

$$\text{Wood equation: } 1/Tg = W1/Tg1 + W2/Tg2 + W3/Tg3 + \ldots + Wx/Tgx$$

[where, Tg1 to Tgx represent the glass transition temperature of homopolymer of each of the monomers 1, 2, 3 . . . x that constitute the anionic group-containing resin, W1 to Wx represent the polymerization fraction of each of the monomers 1, 2, 3 . . . x, and Tg represents the theoretical glass transition temperature. Provided that, the glass transition temperature in the Wood equation is the absolute temperature].

The glass transition temperature of the resin in the emulsion other than the acrylic resin or styrene-acrylic resin is an actually measured glass transition temperature determined by thermal analysis. As the method of thermal analysis, as an example, the glass transition temperature can be measured in conformity with JIS K7121 (Testing Methods for Transition Temperatures of Plastics) using Pyris1 DSC manufactured by PerkinElmer Co., Ltd. under the conditions of a rate of temperature rise of 20° C./min and a nitrogen gas flow rate of 20 ml/min.

From the viewpoint of enhancing the ejection stability of the ink composition, the average particle size of the resin emulsion is preferably 500 nm or less, more preferably 300 nm or less. The average particle size of the emulsion can be determined, as an example, by measuring the D50 value using the Microtrac Particle Size Distribution Analyzer "UPA-150" manufactured by Nikkiso Co., Ltd. for a measurement time of 60 seconds using water as the solvent for dilution.

The proportion of the resin solid in the resin emulsion in the aqueous inkjet ink composition is preferably 0.1% by mass or more, more preferably 0.5% by mass or more, still more preferably 18 by mass or more from the viewpoint of suppressing unevenness in the solid portions of printed and recorded images. The proportion of the resin solid in the resin emulsion in the aqueous inkjet ink composition is preferably 20% by mass or less, more preferably 10% by mass or less from the viewpoint of suppressing the viscosity of the ink composition. In other words, the proportion of the resin solid in the resin emulsion in the aqueous inkjet ink composition is preferably 0.18 by mass or more and 20% by mass or less, more preferably 0.5% by mass or more and 10% by mass or less, still more preferably 18 by mass or more and 10% by mass or less from the viewpoint of suppressing unevenness in the solid portions of printed and recorded images and the viewpoint of suppressing the viscosity of the ink composition.

<Surfactant>

The surfactant contains a polyoxyethylene alkyl ether and a silicone-based surfactant.

The polyoxyethylene alkyl ether is a nonionic surfactant having an HLB value of 7 or more and 12 or less. The polyoxyethylene alkyl ether has an HLB value of preferably 7.5 or more, more preferably 8 or more from the viewpoint of miscibility and has an HLB value of preferably 11.5 or less, more preferably 11 or less from the viewpoint of improving the solid filling in printed and recorded images. In other words, the polyoxyethylene alkyl ether has an HLB value of preferably 7.5 or more and 11.5 or less, more preferably 8 or more and 11 or less from the viewpoint of miscibility and the viewpoint of improving the solid filling in printed and recorded images. The HLB value is an index indicating the degree of hydrophilicity and lipophilicity of a surfactant and is calculated by the Griffin's method. It indicates that the lipophilicity is higher as the HLB value is smaller and the hydrophilicity is higher as the HLB value is larger. As the polyoxyethylene alkyl ether, it is only required to use at least one kind, and two or more kinds can be used in combination.

The number of carbon atoms in the alkyl group and the average number of moles of ethyleneoxy groups added are not limited as long as the polyoxyethylene alkyl ether satisfies the above HLB value, but for example, the number of carbon atoms is preferably about 10 or more and 15 or less and the average number of moles of ethyleneoxy groups added is preferably about 3 or more and 10 or less. The alkyl group may be a straight chain or a branched chain, and is preferably a branched chain from the viewpoint of improving the solid filling in printed and recorded images.

The silicone-based surfactant is a compound having a polysiloxane skeleton, and satisfies a requirement that the maximum value of the transmittance (specific transmittance 1) of a mixture composed of 99.9 parts by mass of water and 0.1 parts by mass of the silicone-based surfactant at 25° C.

and a wavelength of 380 nm to 780 nm is 30% or less, and a requirement that the maximum value of the transmittance (specific transmittance 2) of a mixture composed of 89.9 parts by mass of water, 10 parts by mass of diethylene glycol monobutyl ether, and 0.1 parts by mass of the silicone-based surfactant at 25° C. and a wavelength of 380 nm to 780 nm is 95% or more.

Specific examples of the silicone-based surfactant include BYK-347, BYK-377, and BYK-3455 manufactured by BYK Japan, and are described in, for example, JP-A-2016-222754. As the silicone-based surfactant, it is only required to use at least one kind, and two or more kinds can be used in combination.

<Another Surfactant>

As a surfactant other than the polyoxyethylene alkyl ether and the silicone-based surfactant, known surfactants can be used. In particular, from the viewpoint of having an effect of improving the solid filling of the aqueous inkjet ink composition in printed and recorded images, an acetylene diol-based surfactant and an alkane diol-based surfactant are preferable.

The proportion of the polyoxyethylene alkyl ether in the aqueous inkjet ink composition is preferably 0.2% to 2% by mass, more preferably 0.4% to 1% by mass from the viewpoint of improving the solid filling in printed and recorded images.

The proportion of the silicone-based surfactant in the aqueous inkjet ink composition is preferably 0.01% to 1% by mass, more preferably 0.05% to 0.5% by mass from the viewpoint of enhancing the effect of suppressing unevenness of the ink composition in the solid portions of printed and recorded images.

<Water-Soluble Solvent>

The water-soluble solvent contains a water-soluble solvent having a boiling point of 200° C. or less at 1 atmospheric pressure at 90% by mass or more.

As the water-soluble solvent having a boiling point of 200° C. or less at 1 atmospheric pressure, any known water-soluble solvent that satisfies such a boiling point and is used in aqueous inkjet ink compositions can be used without particular limitation. Examples thereof include monoalcohols, polyhydric alcohols, lower alkyl ethers of polyhydric alcohols, and nitrogen-containing compounds. As the water-soluble solvent having a boiling point of 200° C. or less at 1 atmospheric pressure, it is only required to use at least one kind, and two or more kinds can be used in combination.

Examples of the water-soluble solvent having a boiling point of 200° C. or less at 1 atmospheric pressure include 1-octanol (boiling point: 195° C.), 2-ethylhexanol (boiling point: 184° C.), propylene glycol (boiling point: 188° C.), 1,2-butanediol (boiling point: 197° C.), ethylene glycol (boiling point: 197° C.), 3-methoxy-3-methyl-1-butanol (boiling point: 174° C.), diethylene glycol (boiling point: 245° C.), dipropylene glycol monomethyl ether (boiling point: 188° C.), dipropylene glycol dimethyl ether (boiling point: 175° C.), diethylene glycol monomethyl ether (boiling point: 194° C.), and diethylene glycol monoethyl ether (boiling point: 196° C.).

The proportion of the water-soluble solvent in the aqueous inkjet ink composition is preferably 15% by mass or more, more preferably 25% by mass or more from the viewpoint of enhancing the ejection stability of the ink composition and the formation of an ink film on a non-absorbing printing medium. The proportion of the water-soluble solvent in the aqueous inkjet ink composition is preferably 50% by mass or less, more preferably 45% by mass or less from the viewpoint of enhancing the storage stability of the ink composition. In other words, the proportion of the water-soluble solvent in the aqueous inkjet ink composition is preferably 15% by mass or more and 50% by mass or less, more preferably 25% by mass or more and 45% by mass or less from the viewpoint of enhancing the ejection stability of the ink composition and the formation of an ink film on a non-absorbing printing medium and the viewpoint of enhancing the storage stability of the ink composition.

<Water>

The water includes water as an aqueous medium contained in a pigment dispersion to be described later, water added to prepare the concentration of the aqueous inkjet ink composition of the present invention, and the like. Examples of the water include ion exchanged water, pure water, distilled water, and industrial water. As the water, it is only required to use at least one kind, and two or more kinds can be used in combination.

The proportion of the water in the aqueous inkjet ink composition is preferably 40% by mass or more, more preferably 45% by mass or more from the viewpoint of enhancing the ejection stability of the ink composition. The proportion of the water in the aqueous inkjet ink composition is preferably 70% by mass or less, more preferably 65% by mass or less from the viewpoint of enhancing the ejection stability of the ink composition. In other words, the proportion of the water in the aqueous inkjet ink composition is preferably 40% by mass or more and 70% by mass or less, more preferably 45% by mass or more and 65% by mass or less from the viewpoint of enhancing the ejection stability of the ink composition.

<Other Additives>

Additives such as a known resin, a wax emulsion, a pigment dispersant, a mildewproofing agent, a rust inhibitor, a thickener, an antioxidant, an ultraviolet absorber, a preservability improver, an antifoaming agent, and a pH adjuster can be further added to the aqueous inkjet ink composition of the present invention depending on the purpose.

<Method for Preparing Aqueous Inkjet Ink Composition>

Each of the aqueous inkjet ink compositions may be prepared by using a conventional preparation method, and the above components may be added in order or simultaneously and mixed. Examples of the preparation method include (1) a method in which an aqueous resin varnish obtained by dissolving an anionic group-containing resin in an aqueous medium in the presence of the basic compound, a pigment, and if necessary, a pigment dispersant and the like are mixed, then a pigment dispersion (ink base) is prepared using various dispersers, for example, a ball mill, an attritor, a roll mill, a sand mill, and an agitator mill, and the remaining materials are further added to prepare an aqueous inkjet ink composition; and (2) a method in which a pigment is dispersed by the above-mentioned method, then a resin-coated pigment in which an alkali-soluble resin is deposited on a pigment surface is obtained by, for example, an acid deposition method or an ion exchange method described in Republished patent WO 2005/116147, then the obtained resin-coated pigment is neutralized with a basic compound and redispersed in water using various dispersers (such as a high-speed stirrer), and the remaining materials are further added to prepare an aqueous inkjet ink composition.

The initial viscosity of each of the aqueous inkjet ink compositions is suitably 2.0 to 15.0 mPa·s, more suitably 3.0 to 10.0 mPa·s. The viscosity can be measured using, for example, an E-type viscometer (trade name: RE100L type viscometer, manufactured by Toki Sangyo Co., Ltd.).

<Printed Matter>

The printed matter of the present invention is obtained by performing printing using the aqueous inkjet ink composition. As the printing medium for the aqueous inkjet ink composition, non-absorbent printing media such as coated paper such as art paper, inkjet dedicated paper, and inkjet glossy paper, and plastic base materials such as a polyvinyl chloride sheet; and uncoated paper such as plain paper and offset paper can be used.

Examples of the printing method using the aqueous inkjet ink composition include a method in which inkjet printing is performed by housing the aqueous inkjet ink composition in an ink cartridge, mounting the ink cartridge in an inkjet recording apparatus of a single pass type or the like, and ejecting the aqueous inkjet ink composition from a nozzle to the printing medium.

EXAMPLES

Hereinafter, the present invention will be described in more detail with reference to Examples, but the present invention is not limited only to these Examples. Unless otherwise stated, "g"; means "% by mass".

<Measurement of Specific Transmittance 1 of Mixture of Silicone-Based Surfactant>

A mixture composed of 99.9 parts by mass of water and 0.1 parts by mass of the silicone-based surfactant was prepared. The transmittance of this mixture at 25° C. and a wavelength of 380 nm to 780 nm was measured using a rectangular quartz cell having an optical path length of 10 mm, and the maximum value thereof (specific transmittance 1) was determined.

Measuring instrument: UV-2500PC (Shimadzu Corporation.

Measurement conditions: Slit width: 2 nm, scan speed: fast, wavelength at measurement start: 780 nm, wavelength at measurement end: 380 nm, sampling pitch; auto, measurement mode: single. The reference is water. The results are presented in Table 1.

<Measurement of Specific Transmittance 2 of Mixture of Silicone-Based Surfactant>

A mixture composed of 89.9 parts by mass of water, 10 parts by mass of diethylene glycol monobutyl ether (BDG), and 0.1 parts by mass of the silicone-based surfactant was prepared. The transmittance of this mixture at 25° C. and a wavelength of 380 nm to 780 nm was measured using a rectangular quartz cell having an optical path length of 10 mm, and the maximum value thereof (specific transmittance 2) was determined.

Measuring instrument: UV-2500PC (Shimadzu Corporation)

Measurement conditions: Slit width: 2 nm, scan speed: fast, wavelength at measurement start: 780 nm, wavelength at measurement end: 380 nm, sampling pitch: auto, measurement mode: single. The reference is water.

The results are presented in Table 2.

TABLE 1

| | | Mixture for measuring specific transmittance 1 | | | | | |
|---|---|---|---|---|---|---|---|
| | | 1 | 2 | 3 | 4 | 5 | 6 |
| Water (parts by mass) | | 99.9 | 99.9 | 99.9 | 99.9 | 99.9 | 99.9 |
| Silicone-based surfactant (parts by mass) | BYK347 | 0.1 | — | — | — | — | — |
| | BYK3455 | — | 0.1 | — | — | — | — |
| | BYK333 | — | — | 0.1 | — | — | — |
| | BYK348 | — | — | — | 0.1 | — | — |
| | TEGO WET 270 | — | — | — | — | 0.1 | — |
| | SILFACE SAG500 | — | — | — | — | — | 0.1 |
| Specific transmittance 1 | | 10% | 4% | 100% | 100% | 94% | 94% |

TABLE 2

| | | Mixture for measuring specific transmittance 2 | | | | | |
|---|---|---|---|---|---|---|---|
| | | 1 | 2 | 3 | 4 | 5 | 6 |
| Water (parts by mass) | | 89.9 | 89.9 | 89.9 | 89.9 | 89.9 | 89.9 |
| BDG (parts by mass) | | 10 | 10 | 10 | 10 | 10 | 10 |
| Silicone-based surfactant (parts by mass) | BYK347 | 0.1 | — | — | — | — | — |
| | BYK3455 | — | 0.1 | — | — | — | — |
| | BYK333 | — | — | 0.1 | — | — | — |
| | BYK348 | — | — | — | 0.1 | — | — |
| | TEGO WET 270 | — | — | — | — | 0.1 | — |
| | SILFACE SAG500 | — | — | — | — | — | 0.1 |
| Specific transmittance 2 | | 100% | 100% | 100% | 100% | 100% | 100% |

In Tables 1 and 2, BYK-347 is a polyether-modified siloxane type surfactant with a solid content of 100%, manufactured by BYK Japan;

BYK-3455 is a polyether-modified siloxane type surfactant with a solid content of 100%, manufactured by BYK Japan;

BYK-333 is a polyether-modified siloxane type surfactant with a solid content of 100%, manufactured by BYK Japan;

BYK-348 is a polyether-modified siloxane type surfactant with a solid content of 100%, manufactured by BYK Japan;

TEGO WET 270 is a polyether-modified siloxane copolymer with a solid content of 100%, manufactured by Evonik Industries AG; and SILFACE SAG005 is a polyether-modified siloxane type surface modifier with a solid content of 97%, manufactured by Nissin Chemical Industry Co., Ltd.

<Production of Aqueous Resin Varnish>

In a mixed solution of 2.5 parts by mass of potassium hydroxide and 77.5 parts by mass of water, 20 parts by mass of acrylic acid/lauryl acrylate/styrene copolymer (anionic group-containing resin) having a glass transition temperature of 45° C., a weight average molecular weight of 30,000, and an acid value of 185 mgKOH/g was dissolved to obtain an aqueous resin varnish having a solid content of 20%.

<Preparation of Black Ink Base>

To 23.7 parts by mass of the aqueous resin varnish, 64.3 parts by mass of water was added and mixed to prepare a resin varnish for pigment dispersion. To this varnish, 12 parts by mass of carbon black (trade name Printex 90, manufactured by Degussa AG) was further added, stirring and mixing was performed, and then the mixture was kneaded using a wet circulation mill to prepare a black ink base.

<Preparation of Yellow Ink Base>

To 23.7 parts by mass of the aqueous resin varnish, 64.3 parts by mass of water was added and mixed to prepare a resin varnish for pigment dispersion. To this varnish, 12 parts by mass of a yellow pigment (trade name Nova Palm Yellow 4G 01, manufactured by Clariant AG) was further added, stirring and mixing was performed, and then the mixture was kneaded using a wet circulation mill to prepare a yellow ink base.

<Preparation of Magenta Ink Base>

To 23.7 parts by mass of the aqueous resin varnish, 64.3 parts by mass of water was added and mixed to prepare a resin varnish for pigment dispersion. To this varnish, 12 parts by mass of a magenta pigment (trade name Ink Jet Magenta E5B 02, manufactured by Clariant AG) was further added, stirring and mixing was performed, and then the mixture was kneaded using a wet circulation mill to prepare a magenta ink base.

<Preparation of Cyan Ink Base>

To 23.7 parts by mass of the aqueous resin varnish, 64.3 parts by mass of water was added and mixed to prepare a resin varnish for pigment dispersion. To this varnish, 12 parts by mass of a cyan pigment (trade name Heliogen Blue L 7101 F, manufactured by BASF SE) was further added, stirring and mixing was performed, and then the mixture was kneaded using a wet circulation mill to prepare a cyan ink base.

<Production of Aqueous Inkjet Ink Composition>

Example 1

An aqueous inkjet ink composition of Example 1 was prepared by stirring and mixing the black ink base, propylene glycol, Triton HW1000 (polyoxyethylene alkyl ether, nonionic surfactant, manufactured by DOW Inc.) and BYK-347 as surfactants, NeoCryl A-1092 (styrene-acrylic resin emulsion, glass transition temperature of resin: 9° C., manufactured by Covestro Coating Resins AG) as a resin emulsion, and water so as to have the mass proportions presented in Table 3.

Examples 2 to 14 and Comparative Examples 1 to 8

An aqueous inkjet ink composition of each of Examples and Comparative Examples was produced in the same manner as in Example 1 except that the raw materials used and the amounts thereof were changed as presented in Tables 3 and 4 in each of Examples and Comparative Examples.

<Evaluation of Aqueous Inkjet Ink Composition>

Evaluation was performed by the following methods, and the results thereof are presented in Tables 3 and 4.

<Ejection Stability of Ink Composition>

The aqueous inkjet ink composition obtained above was packed in a cartridge of the Inkjet Printer PX105 (manufactured by Seiko Epson Corp.), printing was performed on coated paper (OK Topcoat+, manufactured by Oji Paper Co., Ltd.), and the ejection stability was evaluated. For passing, it is only required to be Δ or ○, and ○ is more preferable,

[Evaluation Criteria]

○: There is almost no printing disorder and ejection can be stably performed

Δ: There is some printing disorder, but ejection can be performed x: Ejection cannot be performed <Drying Properties on Paper Surface>

The aqueous inkjet ink composition obtained above was packed in a cartridge of the Inkjet Printer PX105 (manufactured by Seiko Epson Corp.), printing was performed on coated paper (OK Topcoat+, manufactured by Oji Paper Co., Ltd.), the obtained printed matter was left to stand at 80° C. for 1 minute, and then the printed portion was rubbed with a cotton swab to evaluate the drying properties based on the state of ink adhesion. For passing, it is only required to be Δ or ○, and ○ is more preferable,

[Evaluation Criteria]

○: Ink has not adhered at all

Δ: A small amount of ink has adhered x: A large amount of ink has adhered

<Solid Filling in Printed Image>

The aqueous inkjet ink composition obtained above was packed in a cartridge of the Inkjet Printer PX105 (manufactured by Seiko Epson Corp.), solid printing was performed on coated paper (OK Topcoat+, manufactured by Oji Paper Co., Ltd.), and streaks and white spots were visually evaluated for the formability of solid printing. For passing, it is only required to be Δ or ○, and ○ is more preferable.

[Evaluation Criteria]

○: No streaks or white spots

Δ: A small number of streaks and white spots x: A large number of streaks and white spots <Unevenness in Solid Portion of Printed Image>

The aqueous inkjet ink composition obtained above was packed in a cartridge of the Inkjet Printer PX105 (manufactured by Seiko Epson Corp.), solid printing was performed on coated paper (OK Topcoat+, manufactured by Oji Paper Co., Ltd.), and the unevenness in the solid printing was visually evaluated. For passing, it is only required to be Δ or ○, and ○ is more preferable.

[Evaluation Criteria]

○: No uneven printing

Δ: Uneven printing at some portions x: Uneven printing overall

TABLE 3

| | | | Example | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Ink base | | Black ink base | 33.0 | | | | 33.0 | 33.0 | 33.0 | 33.0 | 33.0 | 33.0 | 33.0 | 33.0 | 33.0 | 33.0 |
| | | Yellow ink base | | 33.0 | | | | | | | | | | | | |
| | | Magenta ink base | | | 38.0 | | | | | | | | | | | |
| | | Cyan ink base | | | | 25.0 | | | | | | | | | | |
| Water-soluble solvent | | Propylene glycol (boiling point 188° C.) | 30.0 | 30.0 | 28.0 | 34.0 | 25.0 | 28.0 | 30.0 | 28.0 | 30.0 | 30.0 | 30.0 | 30.0 | 30.0 | 30.0 |
| | | Dipropylene glycol dimethyl ether (boiling point 175° C.) | | | | | 5.0 | | | | | | | | | |
| | | Glycerin (boiling point 290° C.) | | | | | | 2.0 | | | | | | | | |
| | | Triethylene glycol (boiling point 287° C.) | | | | | | | | | | | | | | |
| Surfactant (active ingredient) | Polyoxy-ethylene alkyl ether | Triton HW1000 (HLB = 10. 9) | 0.5 | 0.5 | 0.5 | 0.5 | 0.5 | 0.5 | | | 0.5 | 0.5 | 0.5 | 0.5 | 0.5 | 0.5 |
| | | Genapol X050 (HLB = 10. 6) | | | | | | | 0.5 | | | | | | | |
| | | SANNONIC SS-30 (HLB = 8.0) | | | | | | | | 0.5 | | | | | | |
| | | NEWCOL 2502A (HLB = 6.3) | | | | | | | | | | | | | | |
| | | SANNONIC SS-70 (HLB = 12.1) | | | | | | | | | | | | | | |
| | | EMULGEN 1135-S70 (HLB = 17.9) | | | | | | | | | | | | | | |
| | Silicone-based | BYK347 | 0.2 | 0.4 | 0.3 | 0.3 | 0.2 | 0.2 | 0.2 | 0.2 | | | 0.2 | 0.2 | 0.2 | 0.2 |
| | | BYK3455 | | | | | | | | | 0.2 | 0.2 | | | | |
| | | BYK333 | | | | | | | | | | | | | | |
| | | BYK348 | | | | | | | | | | | | | | |
| | Others | Surfynol AD01 | | | | | | | | | | | 0.5 | | | |
| Emulsion (solids) | | NeoCryl A-1092 | 2.4 | 2.4 | 2.4 | 2.4 | 2.4 | 2.4 | 2.4 | 2.4 | 0.4 | 2.4 | 2.4 | | | |
| | | NeoCryl A-655 | | | | | | | | | | | | 2.4 | | |
| | | YODOSOL AD173 | | | | | | | | | | | | | 2.4 | |
| | | Mowiny1 966A | | | | | | | | | | | | | | 2.4 |
| Water | | | 33.9 | 33.7 | 30.8 | 37.8 | 33.9 | 33.9 | 33.9 | 35.9 | 35.9 | 33.9 | 33.4 | 33.9 | 33.9 | 33.9 |
| Total | | | 100.0 | 100.0 | 100.0 | 100.0 | 100.0 | 100.0 | 100.0 | 100.0 | 100.0 | 100.0 | 100.0 | 100.0 | 100.0 | 100.0 |
| Evaluation results | | Ejection stability | ○ | ○ | ○ | ○ | ○ | ○ | ○ | ○ | ○ | ○ | ○ | ○ | ○ | ○ |
| | | Drying properties on paper surface | ○ | ○ | ○ | ○ | ○ | ○ | ○ | ○ | Δ | ○ | ○ | ○ | ○ | ○ |
| | | Solid filling in printed image | Δ | Δ | Δ | Δ | Δ | Δ | Δ | Δ | Δ | Δ | ○ | Δ | Δ | Δ |
| | | Unevenness in solid portion of printed image | ○ | ○ | ○ | ○ | ○ | ○ | ○ | ○ | ○ | ○ | ○ | ○ | ○ | ○ |

TABLE 4

| | | | Comparative Example | | | | | | | | | |
|---|---|---|---|---|---|---|---|---|---|---|---|---|
| | | | 1 | 2 | 3 | 4 | 5 | 6 | 7 | 8 | 9 | 10 |
| Ink base | | Black ink base | 33.0 | 33.0 | 33.0 | 33.0 | 33.0 | 33.0 | 33.0 | 33.0 | 33.0 | 33.0 |
| | | Yellow ink base | | | | | | | | | | |
| | | Magenta ink base | | | | | | | | | | |
| | | Cyan ink base | | | | | | | | | | |
| Water-soluble solvent | | Propylene glycol (boiling point 188° C.) | 22.0 | 22.0 | 30.0 | 30.0 | 30.0 | 30.0 | 30.0 | 30.0 | 30.0 | 30.0 |
| | | Dipropylene glycol dimethyl ether (boiling point 175° C.) | | | | | | | | | | |
| | | Glycerin (boiling point 290° C.) | 8.0 | | | | | | | | | |
| | | Triethylene glycol (boiling point 287° C.) | | 8.0 | | | | | | | | |
| Surfactant (active ingredient) | Poly-oxyethylene alkyl ether | Triton HW1000 (HLB = 10. 9) | 0.5 | 0.5 | | | | 0.5 | 0.5 | 0.5 | 0.5 | 0.5 |
| | | Genapol X050 (HLB = 10.6) | | | | | | | | | | |
| | | SANNONIC SS-30 (HLB = 8.0) | | | | | | | | | | |
| | | NEWCOL 2502A (HLB = 6.3) | | | 0.5 | | | | | | | |
| | | SANNONIC SS-70 (HLB = 12.1) | | | | 0.5 | | | | | | |
| | | EMULGEN 1135-S70 (HLB = 17.9) | | | | | 0.5 | | | | | |

TABLE 4-continued

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Silicone-based | BYK347 | 0.2 | 0.2 | 0.2 | 0.2 | 0.2 | | | 0.2 | | |
| | BYK3455 | | | | | | | | | | |
| | BYK333 | | | | | | 0.2 | | | | |
| | BYK348 | | | | | | | 0.2 | | | |
| | TEGO WET 270 | | | | | | | | | 0.2 | |
| | SILFACE SAG500 | | | | | | | | | | 0.2 |
| Others | Surfynol AD01 | | | | | | | | | | |
| Emulsion (solids) | NeoCryl A-1092 | 2.4 | 2.4 | 2.4 | 2.4 | 2.4 | 2.4 | 2.4 | | 2.4 | 2.4 |
| | NeoCryl A-655 | | | | | | | | | | |
| | YODOSOL AD173 | | | | | | | | | | |
| | Mowinyl 966A | | | | | | | | | | |
| Water | | 33.9 | 33.9 | 33.9 | 33.9 | 33.9 | 33.9 | 33.9 | 36.3 | 33. 9 | 33.9 |
| Total | | 100.0 | 100.0 | 100.0 | 100.0 | 100.0 | 100.0 | 100.0 | 100.0 | 100.0 | 100.0 |
| Evaluation results | Ejection stability | ○ | ○ | ○ | ○ | ○ | ○ | ○ | ○ | ○ | ○ |
| | Drying properties on paper surface | X | X | ○ | ○ | ○ | ○ | ○ | X | ○ | ○ |
| | Solid filling in printed image | Δ | Δ | X | X | X | Δ | Δ | Δ | Δ | Δ |
| | Unevenness in solid portion of printed image | ○ | ○ | ○ | ○ | ○ | X | X | ○ | X | X |

In Tables 3 and 4, Triton HW1000 is a polyoxyethylene alkyl ether, a nonionic surfactant with an HLB value of 10.9, manufactured by DOW Inc.;

Genapol X050 is a polyoxyethylene alkyl ether, a nonionic surfactant with an HLB value of 10.6, manufactured by Clariant AG;

SANNONIC SS-30 is a polyoxyethylene alkyl ether, a nonionic surfactant with an HLB value of 8.0, manufactured by Sanyo Chemical Industries, Ltd.;

NEWCOL 2502A is a polyoxyethylene alkyl ether, a nonionic surfactant with an HLB value of 6.3, manufactured by Nippon Nyukazai Co., Ltd.;

SANNONIC SS-70 is a polyoxyethylene alkyl ether, a nonionic surfactant with an HLB value of 12.1, manufactured by Sanyo Chemical Industries, Ltd.;

EMULGEN 1135S-70 is a polyoxyethylene alkyl ether, a nonionic surfactant with an HLB value of 17.9, manufactured by Kao Corporation;

Surfynol AD01 is an alkane diol-based surfactant, a nonionic surfactant, manufactured by Evonik Industries AG; NeoCryl A-1092 is a styrene-acrylic resin emulsion with a glass transition temperature of 9° C., manufactured by Covestro Coating Resins AG;

NeoCryl A-655 is a styrene-acrylic resin emulsion with a glass transition temperature of 33° C., manufactured by Covestro Coating Resins AG;

YODOSOL AD173 is an acrylic resin emulsion with a glass transition temperature of −25° C., manufactured by Henkel AG & Co. KGaA; and Mowinyl 966A is a styrene-acrylic resin emulsion with a glass transition temperature of −32° C., manufactured by Japan Coating Resin Corporation.

What is claimed is:

1. An aqueous inkjet ink composition comprising a pigment; an anionic group-containing resin; a resin emulsion; a surfactant; a water-soluble solvent; and water, wherein the water-soluble solvent contains a water-soluble solvent having a boiling point of 200° C. or less at 1 atmospheric pressure at 90% by mass or more, the surfactant contains a polyoxyethylene alkyl ether and a silicone-based surfactant, the polyoxyethylene alkyl ether has an HLB value of 7 or more and 12 or less, and the silicone-based surfactant satisfies the following requirements:

a maximum value of a transmittance of a mixture composed of 99.9 parts by mass of water and 0.1 parts by mass of the silicone-based surfactant at 25° C. and a wavelength of 380 nm to 780 nm is 30% or less, and a maximum value of a transmittance of a mixture composed of 89.9 parts by mass of water, 10 parts by mass of diethylene glycol monobutyl ether, and 0.1 parts by mass of the silicone-based surfactant at 25° C. and a wavelength of 380 nm to 780 nm is 95% or more.

2. The aqueous inkjet ink composition according to claim 1, further comprising one or more surfactants selected from the group consisting of an acetylene diol-based surfactant and an alkane diol-based surfactant.

3. The aqueous inkjet ink composition according to claim 2, wherein the resin emulsion is one or more selected from the group consisting of an acrylic resin emulsion and a styrene-acrylic resin emulsion.

4. The aqueous inkjet ink composition according to claim 2, wherein a glass transition temperature of a resin in the resin emulsion is −35° C. or more and 35° C. or less.

5. The aqueous inkjet ink composition according to claim 2, wherein the polyoxyethylene alkyl ether is a branched chain having an alkyl group having 10 or more and 15 or less carbon atoms, and has an average number of moles of ethyleneoxy groups added of 3 or more and 10 or less.

6. A printed matter obtained by performing printing using the aqueous inkjet ink composition according to claim 2.

7. The aqueous inkjet ink composition according to claim 1, wherein the water-soluble solvent having a boiling point of 200° C. or less at 1 atmospheric pressure is propylene glycol.

8. The aqueous inkjet ink composition according to claim 1, wherein the resin emulsion is one or more selected from the group consisting of an acrylic resin emulsion and a styrene-acrylic resin emulsion.

9. The aqueous inkjet ink composition according to claim 1, wherein a glass transition temperature of a resin in the resin emulsion is −35° C. or more and 35° C. or less.

10. The aqueous inkjet ink composition according to claim 1, wherein the polyoxyethylene alkyl ether is a branched chain having an alkyl group having 10 or more and 15 or less carbon atoms, and has an average number of moles of ethyleneoxy groups added of 3 or more and 10 or less.

11. A printed matter obtained by performing printing using the aqueous inkjet ink composition according to claim 1.

12. The aqueous inkjet ink composition according to claim 2, wherein the water-soluble solvent having a boiling point of 200° C. or less at 1 atmospheric pressure is propylene glycol.

* * * * *